United States Patent
Chu et al.

(10) Patent No.: US 9,296,946 B2
(45) Date of Patent: *Mar. 29, 2016

(54) METHOD OF MANUFACTURING OXYNITRIDE PHOSPHOR

(75) Inventors: Cheng-I Chu, Taipei (TW); Ru-Shi Liu, Taipei (TW); Yu-Chih Lin, Taoyuan (TW); Chen-Hong Lee, Taoyuan (TW); Wei-Kang Cheng, Taoyuan (TW); Yi-Sheng Ting, Taoyuan (TW); Shyi-Ming Pan, Taoyuan (TW)

(73) Assignee: Formosa Epitaxy Incorporated, Taoyuan County (TW)

( * ) Notice: Subject to any disclaimer, the term of this patent is extended or adjusted under 35 U.S.C. 154(b) by 351 days.

This patent is subject to a terminal disclaimer.

(21) Appl. No.: 13/541,871

(22) Filed: Jul. 5, 2012

(65) Prior Publication Data
US 2013/0009095 A1 Jan. 10, 2013

(30) Foreign Application Priority Data

Jul. 5, 2011 (TW) .............................. 100123636 A

(51) Int. Cl.
*C09K 11/59* (2006.01)
*C09K 11/08* (2006.01)
*C09K 11/77* (2006.01)

(52) U.S. Cl.
CPC ......... *C09K 11/0883* (2013.01); *C09K 11/7734* (2013.01)

(58) Field of Classification Search
USPC ......... 252/301.4 F, 301.4 R, 301.6 F, 301.6 R
See application file for complete search history.

(56) References Cited

U.S. PATENT DOCUMENTS 7,540,977 B2 * 6/2009 Hirosaki et al. ........ 252/301.4 F
7,833,436 B2 * 11/2010 Shimooka et al. ...... 252/301.4 F

* cited by examiner

*Primary Examiner* — Carol M Koslow
(74) *Attorney, Agent, or Firm* — Rosenberg, Klein & Lee

(57) ABSTRACT

A method of manufacturing an oxynitride phosphor is revealed. A precursor is sintered under 0.1-1000 MPa nitrogen pressure for synthesis of an oxynitride phosphor. The general formula of the oxynitride phosphors is $Ba_{3-x}Si_6O_{12}N_2:Eu_x$, $Ba_{3-x}Si_6O_6N_6:Eu_x$ or $Ba_{3-x}Si_6O_9N_4:Eu_x$ ($0.00001 \leq x \leq 5$; 0.00001). Thus pure phosphor can be mass-produced.

6 Claims, 11 Drawing Sheets

| Sample | Emission (nm) | FWHM (nm) | Intensity | Relative intensity | RQO (%,relative) |
|---|---|---|---|---|---|
| unwashed | 526 | 71 | 213973000 | 76 | 100 |
| washed | 524 | 69 | 282499000 | 100 | 125 |
| 10% seed crystal | 524 | 69 | 327802000 | 116 | 146 |
| 20% seed crystal | 524 | 70 | 347434000 | 123 | 157 |
| 30% seed crystal | 524 | 70 | 361935000 | 128 | 162 |
| 40% seed crystal | 524 | 70 | 364126336 | 129 | 165 |
| flux | 523 | 69 | 284158000 | 101 | 126 |

FIG.9

METHOD OF MANUFACTURING OXYNITRIDE PHOSPHOR

BACKGROUND OF THE INVENTION

1. Fields of the Invention

The present invention relates to a method of manufacturing a phosphor, especially to a method of manufacturing an oxynitride phosphor.

2. Descriptions of Related Art

In developed countries worldwide, white-light LED (light emitting diode)-based lighting will gradually replace conventional light sources due to energy savings, carbon reduction, and environment protection. The advantages of LED include compact size, low power consumption, long life time, low heat emission, and short reaction time. LED is easy to install in equipment, of low heat radiation, and used for high frequency operation and over 100 thousand hours. It uses only one-eighths or one-tenths power in comparison with conventional light bulbs and a half power compared with fluorescent lights. LED overcomes a plurality of shortcomings of incandescent bulbs. Thus the white-light LED is a new light source for illumination and displays of the 21st century. It is called green light source due to its features of energy saving and environment protection.

Refer to U.S. Pat. No. 5,998,925 applied by Japanese Nichia Corporation filed in 1996, a light emitting diode (LED) employs a gallium nitride compound semiconductor element emitting blue light and a garnet phosphor activated with cerium in combination. The phosphor is preferably yttrium-aluminum-garnet fluorescent material (YAG phosphor) activated with cerium (YAG:Ce). With this configuration, the LED can emit white light by blending blue light emitted by the light emitting components and yellow light emitted by the phosphor excited by the blue light. The nitride phosphors available now have better thermal resistance and water resistance yet the cost is high. As to oxide phosphors, the cost is low but it has poor thermal stability and poor water resistance. Thus oxynitride phosphors have received considerable attention compared to the existing nitride and oxide phosphors. There is no nitride with extreme air-sensitivity used in a precursor for synthesis of the oxynitride phosphors. Using a part of oxides reduces the synthesis temperature. Moreover, the oxynitride phosphors have good stability similar to that of the nitrides. The oxynitride phosphors have advantages of both oxides and nitrides. Thus a plurality of oxynitride phosphors including β-SiAlON, $MSi_2O_2N_2$ (M=Ca, Sr, Ba), etc. has been provided in recent years.

In 2009, Mitsubishi Chemical Corporation has also applied for the patent with Pub. No. WO/2009/017206, App. No. PCT/JP2008/063802 filed on Jul. 31, 2008 and the title is "PHOSPHOR AND METHOD FOR PRODUCING THE SAME, CRYSTALLINE SILICON NITRIDE AND METHOD FOR PRODUCING THE SAME, PHOSPHOR-CONTAINING COMPOSITION, LIGHT-EMITTING DEVICE USING THE PHOSPHOR, IMAGE DISPLAY DEVICE, AND ILLUMINATING DEVICE". The sample revealed in this patent is synthesized under normal pressure and a pure product is obtained by using pre-treated silicon nitride ($Si_3N_4$) precursor.

SUMMARY OF THE INVENTION

Therefore it is a primary object of the present invention to provide a method of manufacturing an oxynitride phosphor. A precursor is sintered under high pressure for synthesis of an oxynitride phosphor. Compared to oxynitride phosphor synthesized by sintering a precursor under normal pressure, the oxynitride phosphor produced by the present invention is of higher purity. Moreover, the light intensity and stability of the phosphor are increased effectively.

It is another object of the present invention to provide a method of manufacturing an oxynitride phosphor in which an oxynitride is synthesized by sintering of a precursor under high pressure. The manufacturing process of the method is simple and the oxynitride phosphor is mass-produced.

In order to achieve the above objects, a method of manufacturing an oxynitride phosphor of the present invention includes a plurality of steps. Firstly, provide a precursor. Then sinter the precursor under 0.1-1000 MPa nitrogen pressure to get an oxynitride phosphor, wherein the oxynitride phosphor is $Ba_{3-x}Si_6O_{12}N_2$:$Eu_x$、$Ba_{3-x}Si_6O_6N_6$:$Eu_x$ or $Ba_{3-x}Si_6O_9N_4$:$Eu_x$. x is ranging from 0.0001 to 5.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 9 is a table showing spectral data of the seventh embodiment according to the present invention;

DETAILED DESCRIPTION OF THE PREFERRED EMBODIMENT

In patents available now, oxynitride phosphors ($Ba_{3-x}Si_6O_{12}N_2$:$Eu_x$) are generally obtained by normal pressure sintering (under 0.1 MPa). In the present invention, pure oxynitride phosphor ($Ba_{3-x}Si_6O_{12}N_2$:$Eu_x$) is synthesized by sintering under nitrogen pressure of 0.92 MPa. The phosphor obtained by the method of the present invention has higher levels of purity than the phosphor prepared by the conventional normal pressure sintering. Moreover, the luminous intensity and heat resistance of the oxynitride phosphor is improved by seed mediated method, acid washing or flux method. And the phosphor particle size can also be controlled.

Figure 1:
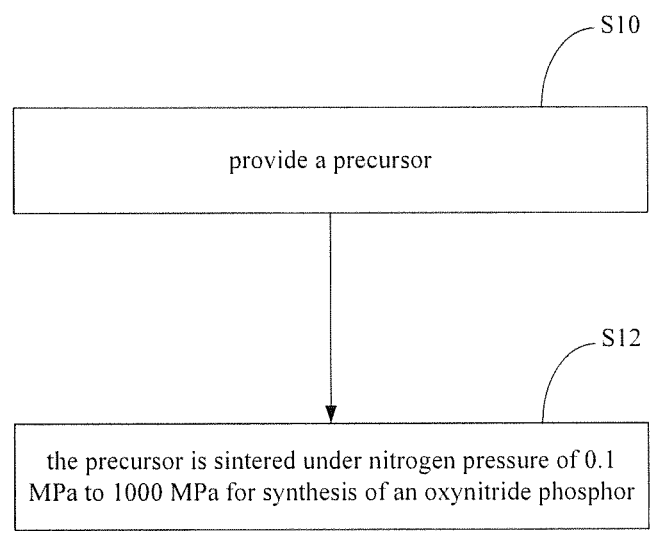
FIG. 1 is a flow chart of the first embodiment according to the present invention.

Refer to FIG. 1, a flow chart of an embodiment according to the present invention is revealed. As shown in figure, a method of manufacturing oxynitride phosphor of the present invention includes a plurality of steps. Firstly run the step S10, provide a precursor. Then take the step S12, the precursor is sintered under nitrogen pressure of 0.1 MPa to 1000 MPa for synthesis of an oxynitride phosphor. The oxynitride phosphor is $Ba_{3-x}Si_6O_{12}N_2:Eu_x$、$Ba_{3-x}Si_6O_6N_6:Eu_x$ or $Ba_{3-x}Si_6O_9N_4:Eu_x$ x is ranging from 0.0001 to 5.

Figure 2:
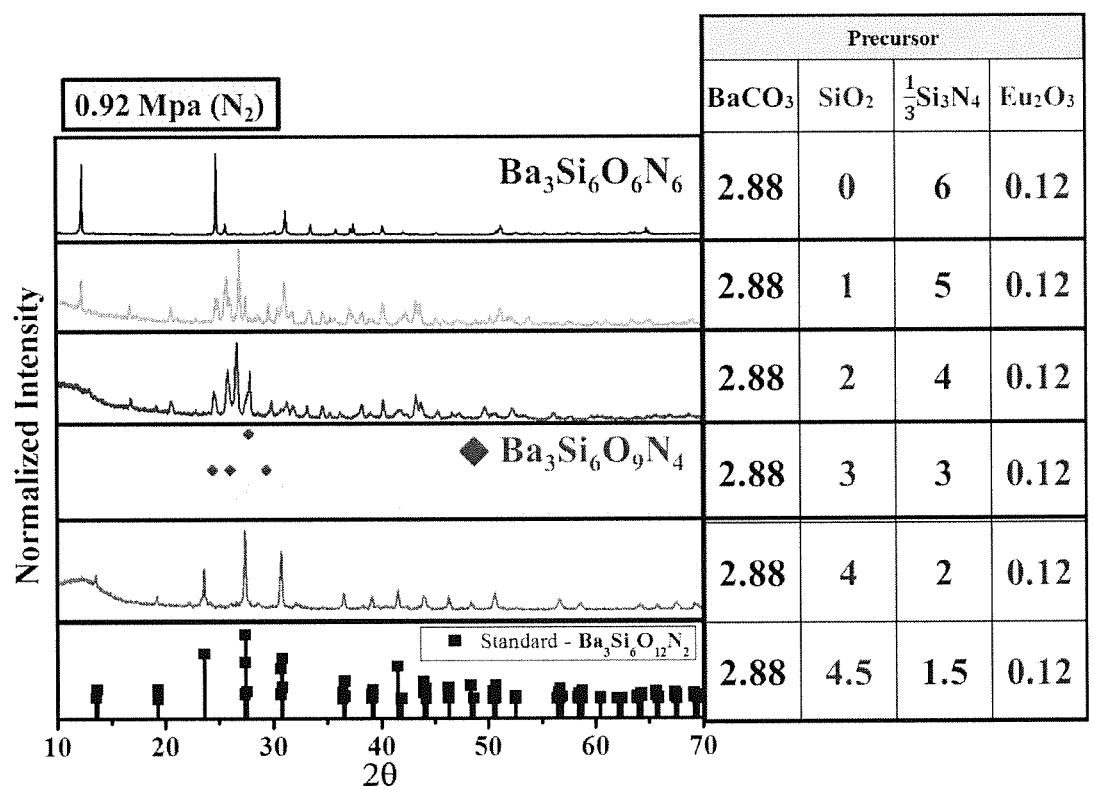
FIG. 2 shows X-ray powder diffraction (XRD) patterns of the second embodiment according to the present invention.

Refer to FIG. 2, X-ray powder diffraction (XRD) patterns of another embodiment according to the present invention are revealed. As shown in the figure, the precursor used in this embodiment includes at least one of elements selected from barium carbonate ($BaCO_3$), silicon dioxide ($SiO_2$), silicon nitride($Si_3N_4$), and europium oxide ($Eu_2O_3$). According to a certain molar ratio, barium carbonate ($BaCO_3$), silicon dioxide ($SiO_2$), silicon nitride($Si_3N_4$), and europium oxide ($Eu_2O_3$) are ground and set into a reaction furnace for sintering conducted under nitrogen pressure to get an oxynitride phosphor $Ba_3Si_6O_{12}N_2$. A sintering pressure is 0.92 MPa nitrogen pressure, A sintering temperature is 1375 degrees Celsius, A sintering time is 1 hour and the temperature increasing/decreasing rate is 5° C./min. The preparation of the above oxynitride phosphor is by the solid-state synthesis method. The manufacturing process is simple so that the oxynitride phosphor can be mass-produced.

It is learned from the FIG. 2 that different oxynitride phosphors are obtained such as $Ba_3Si_6O_6N_6$, $Ba_3Si_6O_9N_4$, $Ba_3Si_6O_{12}N_2$ by changing the ratio of the silicon dioxide ($SiO_2$) to the silicon nitride ($Si_3N_4$) in the precursor. Especially when the ratio of the silicon dioxide to the silicon nitride is 4:2, high purity pure oxynitride phosphor ($Ba_3Si_6O_{12}N_2$) without the second phase is obtained. The spectrum of pure $Ba_3Si_6O_{12}N_2$ without the second phase is shown on the bottom of the FIG. 2.

Figure 3:
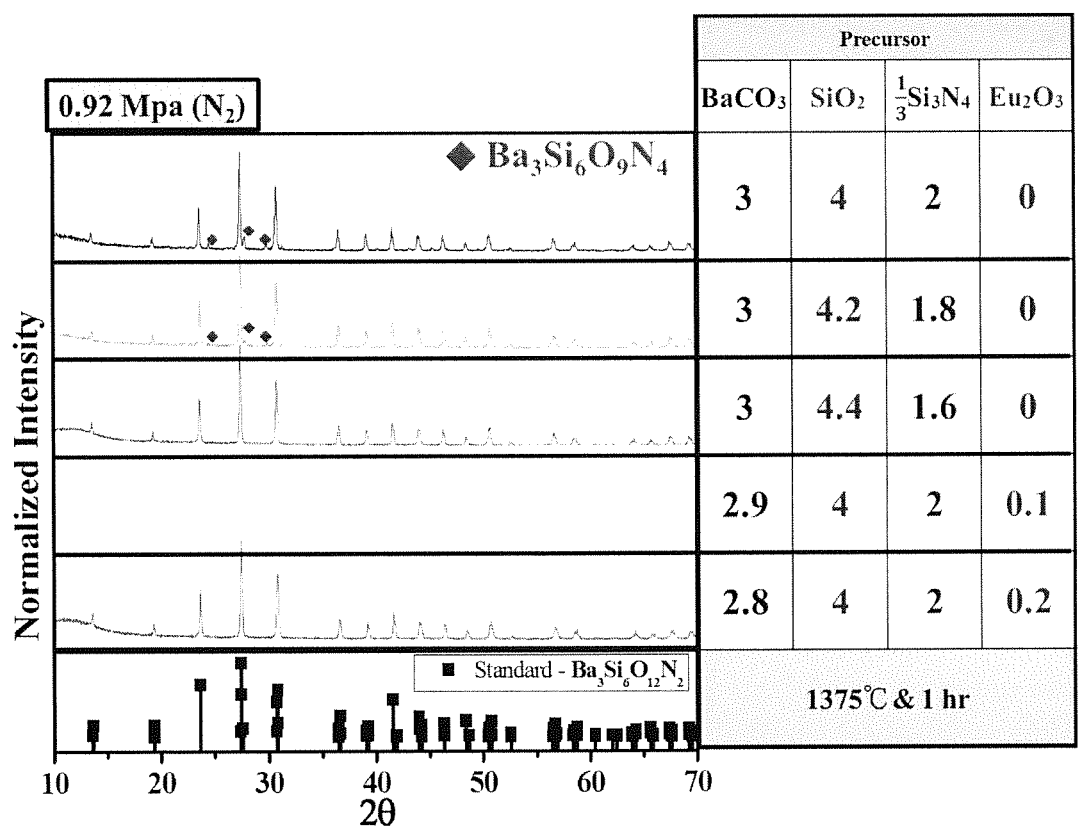
FIG. 3 shows X-ray powder diffraction (XRD) patterns of the third embodiment according to the present invention.

Refer to FIG. 3, X-ray powder diffraction (XRD) patterns of a further embodiment according to the present invention are disclosed. As shown in the figure, the concentration of europium oxide (activator) in the precursor is changed. Refer to FIG. 2, $BaCO_3:SiO_2:\frac{1}{3}Si_3N_4:Eu_2O_3=2.88:4:2:0.12$ and the embodiment is pure oxynitride ($Ba_3Si_6O_9N_4$) without the second phase. In this embodiment, $BaCO_3:SiO_2:\frac{1}{3}Si_3N_4:Eu_2O_3=3:4:2:0$. Without doping of $Eu_2O_3$, the oxynitride with higher nitrogen content ($Ba_3Si_6O_9N_4$) is generated. It is learned that the europium oxide (activator) also affects phase purity of the oxynitride phosphor.

Figure 4:
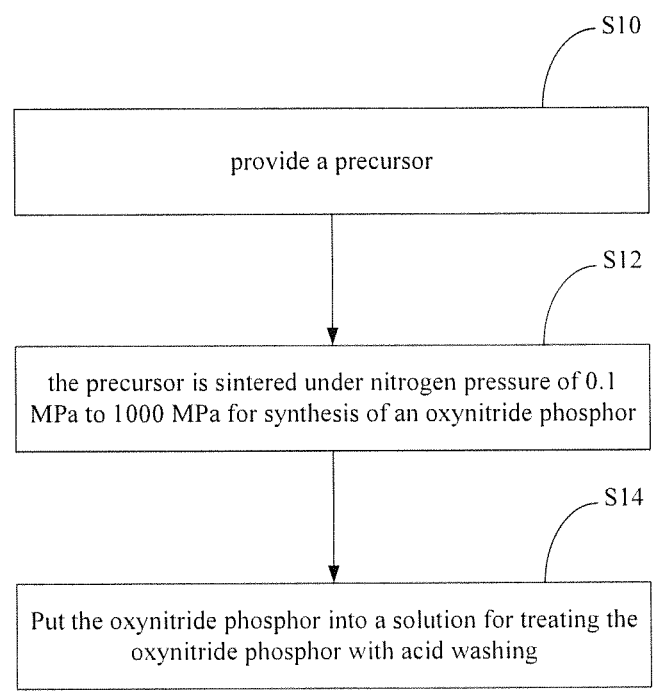
FIG. 4 is a flow chart of a fourth embodiment according to the present invention.

Refer to FIG. 4, a flow chart of a fourth embodiment according to the present invention is revealed. As shown in the figure, after the step S10 and step S12 shown in FIG. 1, run the step S14. Put the oxynitride phosphor into a solution for treating the oxynitride phosphor with acid washing. Then wash the oxynitride phosphor by the solution at least one time to obtain the acid washed oxynitride phosphor after removing the solution. The solution is an acid solute dissolved in a solvent. The concentration of the acid solute is ranging from 0% to 100% and greater than 0%, and the solvent can be organic solvents or water. In this embodiment, the oxynitride phosphor is suspended in 10% nitric acid ($H_3NO_3$) for acid washing therein. After acid washing, wash a sample of the oxynitride phosphor twice with deionized water, once with alcohol and dry the sample by heat so as to remove impurities.

Figure 5:
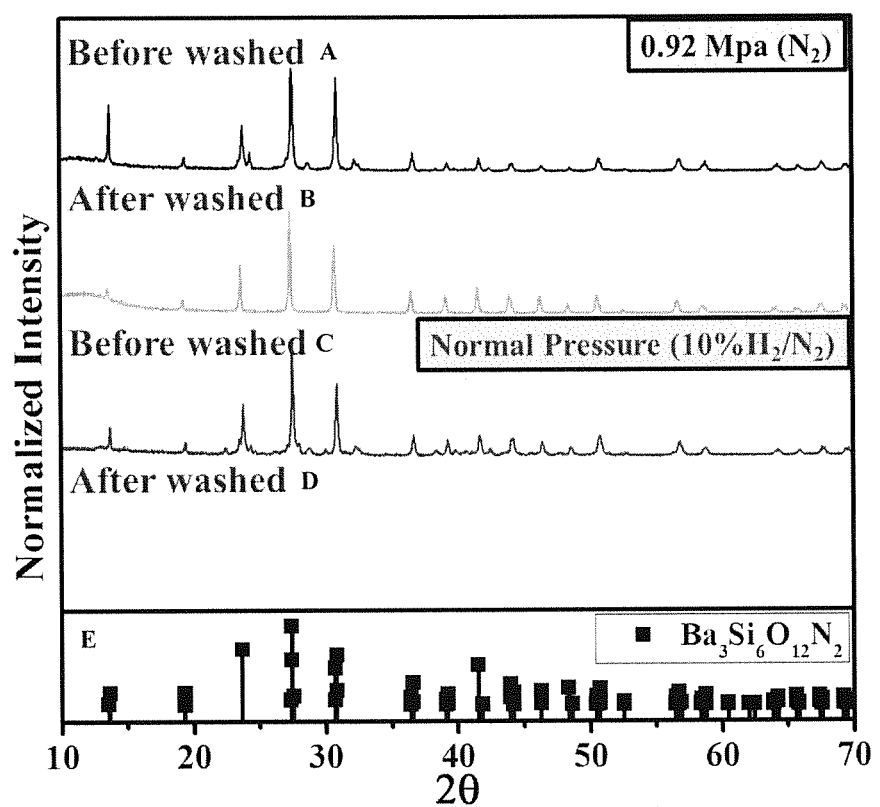
FIG. 5 shows X-ray powder diffraction (XRD) patterns of the fourth embodiment according to the present invention.

Refer to FIG. 5, X-ray powder diffraction (XRD) patterns of the fourth embodiment according to the present invention are disclosed. There are five patterns shown in the FIG. 5. The first spectrum A and the second spectrum B are spectra of the oxynitride phosphor synthesized under the nitrogen pressure of 0.92 MPa while the third spectrum C and the fourth spectrum D are spectra of the oxynitride phosphor synthesized at normal pressure. As to the fifth spectrum E, it is a spectrum of pure oxynitride phosphor. The first spectrum A and the third spectrum C are spectra of the oxynitride phosphor before acid washing. The second spectrum B and the fourth spectrum D are spectra of the acid-washed oxynitride phosphor. The fifth spectrum E is the spectrum of the pure oxynitride phosphor. The second spectrum B, the fourth spectrum D and the fifth spectrum E show similar wave patterns and this means that the acid washing process used to treat the oxynitride phosphor removes impurities of the oxynitride phosphor and get pure oxynitride phosphor. The first spectrum A is a spectrum of the second embodiment shown in FIG. 2.

Figure 6:
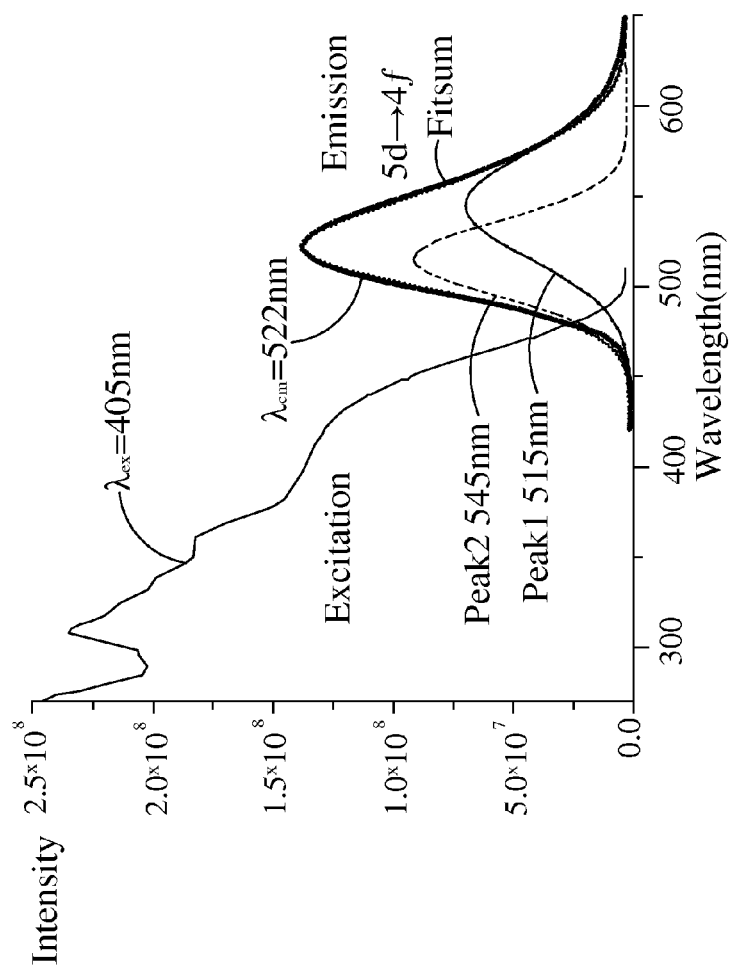
FIG. 6 shows excitation and emission spectra of a fifth embodiment according to the present invention.

Refer to FIG. 6, excitation and emission spectra of the fifth embodiment according to the present invention are revealed. As shown in the figure, the oxynitride phosphor is excited by light or electrons with a wavelength range of 130-550 nm. When the oxynitride phosphor is excited by the light, the wavelength of light emitted from the excited oxynitride phosphor is ranging from 400 nm to 800 nm.

Figure 7:
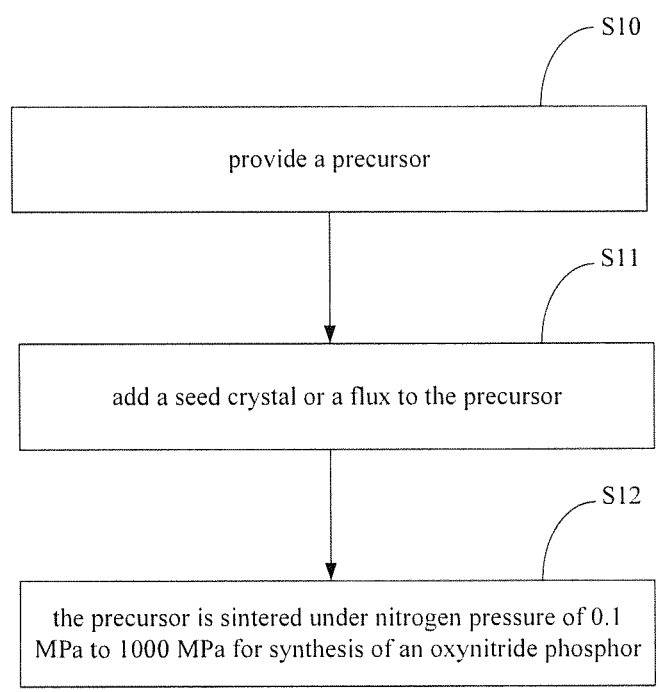
FIG. 7 is a flow chart of the sixth embodiment according to the present invention.

Refer to FIG. 7, a flow chart of the sixth embodiment according to the present invention is revealed. After the step S10, run the step S11, add a seed crystal or a flux to the precursor. Then take the step S12 to obtain an oxynitride phosphor. The seed crystal is an oxynitride phosphor ($Ba_{2.89}Si_6O_{12}N_2:Eu_{0.11}$) having a particle size of 100 μm. The weight of the seed crystal is about 1% to 60% of total weight of the oxynitride phosphor obtained. The flux can be barium fluoride ($BaF_2$) and the weight of the flux is ranging from 0.01 to 10% of total weight of the oxynitride phosphor.

Figure 8:
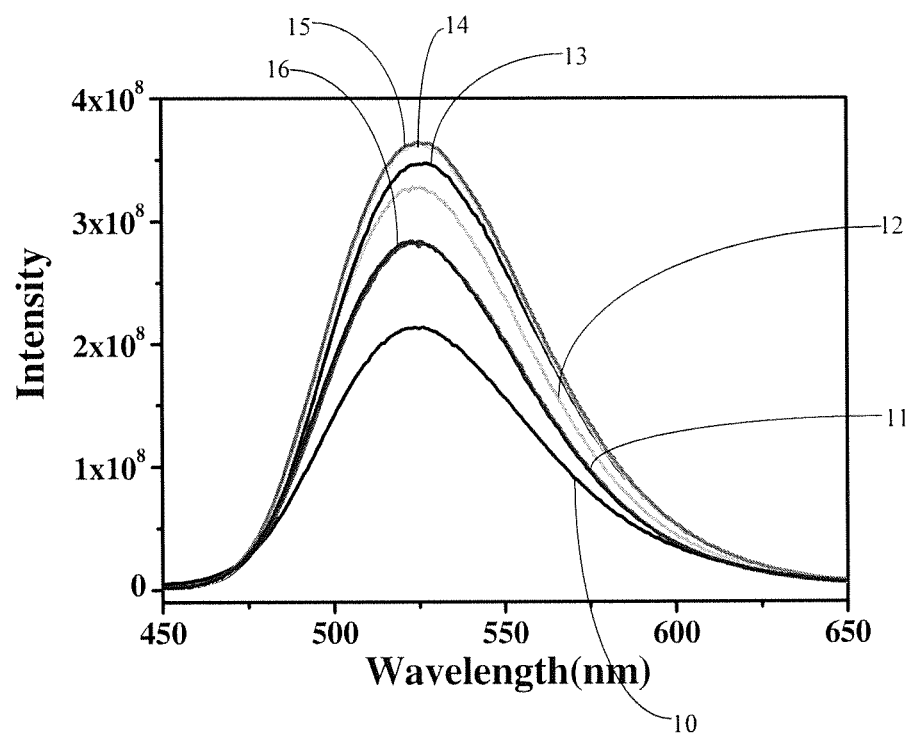
FIG. 8 shows emission spectra of the seventh embodiment according to the present invention.

Refer to FIG. 8 and FIG. 9, emission spectra of light intensity vs. frequency of the seventh embodiment according to the present invention is revealed. As shown in the figure, there are seven curves included in this embodiment. The first curve 10 is a spectrum of the second embodiment of oxynitride phosphors. The second curve 11 is a spectrum of an oxynitride phosphor. The third curve 12 is a spectrum of an oxynitride phosphor added with 10% seed crystal. The fourth curve 13 is a spectrum of an oxynitride phosphor added with 20% seed crystal. The fifth curve 14 is a spectrum of an oxynitride phosphor added with 30% seed crystal. The sixth curve 15 is a spectrum of an oxynitride phosphor added with 40% seed crystal. The seventh curve 16 is a spectrum of an oxynitride phosphor added with 5% flux (barium fluoride).

The spectrum is integrated to get area under the peaks in the spectrum of peak wavelength vs. light intensity. Compared integral spectrum of the oxynitride phosphor synthesized by seed mediated method, acid washing or flux method with that of the oxynitride phosphor of the second embodiment, the light intensity of the oxynitride phosphor is increased effectively by acid washing, addition of seed crystal or addition of flux. The higher concentration the seed crystal added, the higher the light intensity of the synthesized oxynitride phosphor. According to the area (integral), the seed mediated method, acid washing or the flux method could effectively increase the light intensity of the oxynitride phosphor.

Figure 11:
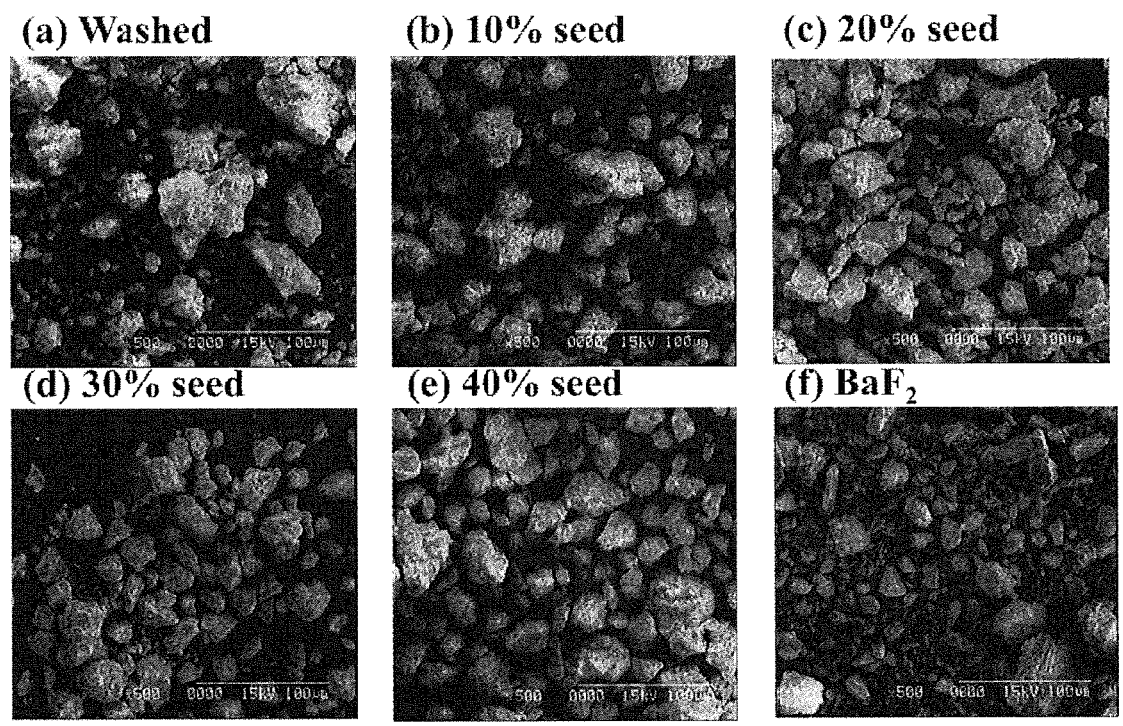
FIG. 11 shows scanning electron microscopy images of an eighth embodiment of the present invention.

Refer to the FIG. 11, scanning electron microscopy (SEM) images of an eighth embodiment are revealed. There are six scanning electron microscopy images. The first SEM image (a) is taken from a specimen of an oxynitride phosphor treated by acid washing. The second SEM image (b) is taken from a specimen of an oxynitride phosphor with 10% seed crystal. The third SEM image (c) is taken from a specimen of an oxynitride phosphor with 20% seed crystal. The fourth SEM image (d) is taken from a specimen of an oxynitride phosphor with 30% seed crystal. The fifth SEM image (e) is taken from a specimen of an oxynitride phosphor with 40% seed crystal. The second SEM image (f) is taken from a specimen of an oxynitride phosphor with 5% flux.

According to the above SEM images, it is learned that the particle size of the synthesized oxynitride phosphor is gradually increased and the phosphor particles are distributed more evenly along with the increasing concentration of the seed crystal added.

Figure 10:
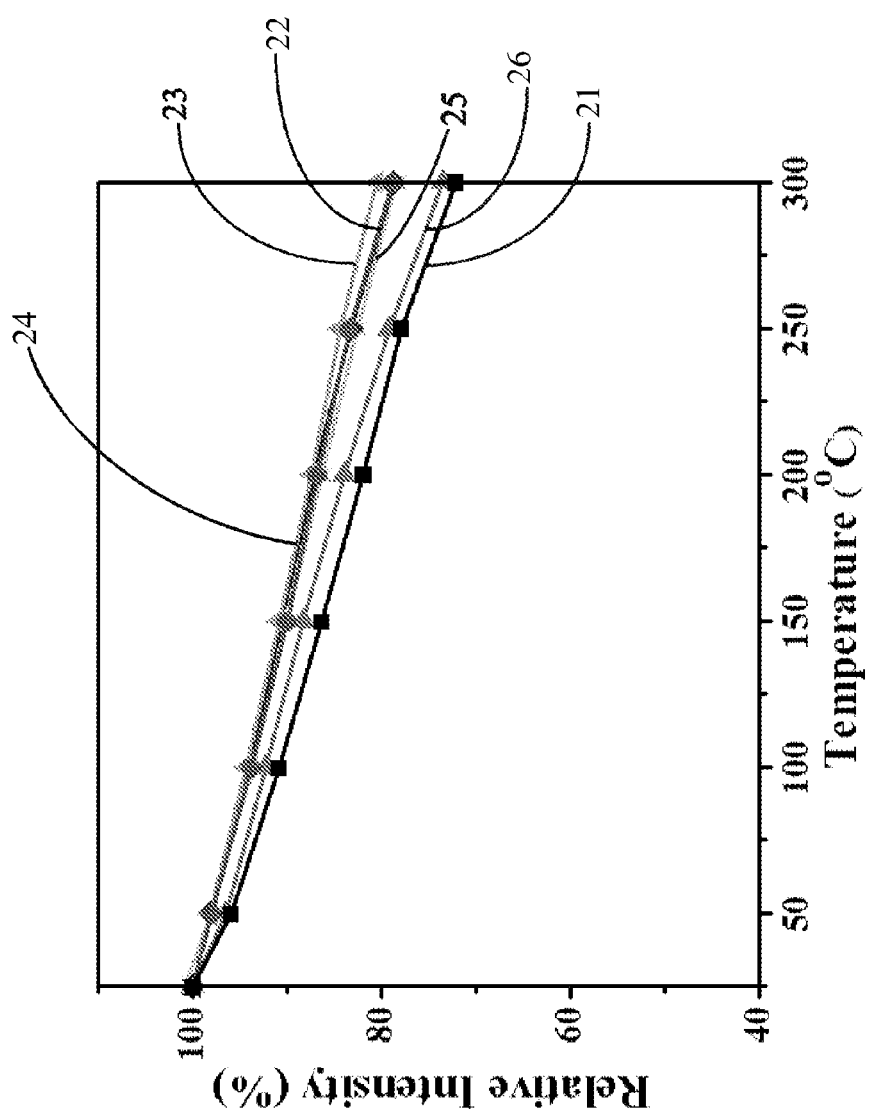
FIG. 10 is a schematic drawing showing thermal resistance curves of the ninth embodiment according to the present invention.

Refer to FIG. 10, a diagram showing thermal resistance curves of the ninth embodiment of the present invention is disclosed. The first curve 21 is the thermal resistance curve of an oxynitride phosphor treated by acid washing. The second curve 22 is the thermal resistance curve of an oxynitride phosphor with 10% seed crystal. The third curve 23 is the thermal resistance curve of an oxynitride phosphor with 20% seed crystal. The fourth curve 24 is the thermal resistance curve of an oxynitride phosphor with 30% seed crystal. The fifth curve 25 is the thermal resistance curve of an oxynitride phosphor with 40% seed crystal. The sixth curve 26 is the thermal resistance curve of an oxynitride phosphor with flux. The curves show that the oxynitride phosphor added with seed crystal has better thermal resistance under 300 degrees Celsius.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A method of manufacturing an oxynitride phosphor comprising the steps of:
   providing a precursor, wherein the precursor includes at least one of elements selected from barium carbonate ($BaCO_3$), silicon dioxide ($SiO_2$), silicon nitride($Si_3N_4$), and europium oxide ($Eu_2O_3$), a ratio of $SiO_2$ to ⅓$Si_3N_4$ is 4:2; and
   sintering the precursor under nitrogen pressure ranging from 0.1 to 1000 MPa for synthesis of an oxynitride phosphor;
   wherein the oxynitride phosphor is $Ba_{3-x}Si_6O_{12}N_2:Eu_x$, $Ba_{3-x}Si_6O_6N_6:Eu_x$ or $Ba_{3-x}Si_6O_9N_4:Eu_x$; and
   wherein x is ranging from 0.9 to 3.

2. The method as claimed in claim 1, wherein a sintering temperature is 1375 degrees Celsius.

3. The method as claimed in claim 1, wherein the method further includes a step of: acid-washing the oxynitride phosphor in a solution.

4. The method as claimed in claim 3, wherein the solution is formed by an acid solute dissolved in a solvent; a concentration of the acid solute is ranging from 0% to 100% and greater than 0%, and the solvent is selected from organic solvent or water.

5. A method of manufacturing an oxynitride phosphor comprising the steps of:
   providing a precursor, wherein the precursor is added with at least one seed crystal, and the seed crystal is an oxynitride phosphor having a particle size equal to 100 μm and the weight of the seed crystal is ranging from 1% to 60% of total weight of the oxynitride phosphor; and
   sintering the precursor under nitrogen pressure ranging from 0.1 to 1000 MPa for synthesis of an oxynitride phosphor;
   wherein the oxynitride phosphor is $Ba_{3-x}Si_6O_{12}N_2:Eu_x$, $Ba_{3-x}Si_6O_6N_6:Eu_x$ or $Ba_{3-x}Si_6O_9N_4:Eu_x$;
   wherein x is ranging from 0.9 to 3.

6. The method as claimed in claim 1, wherein the method further comprising providing at least one flux whose weight is ranging from 0.01 to 10% of total weight of the oxynitride phosphor.

* * * * *